March 15, 1966  H. E. LOGAN  3,240,406
CYCLE CARRIER FOR VEHICLES
Filed June 16, 1961
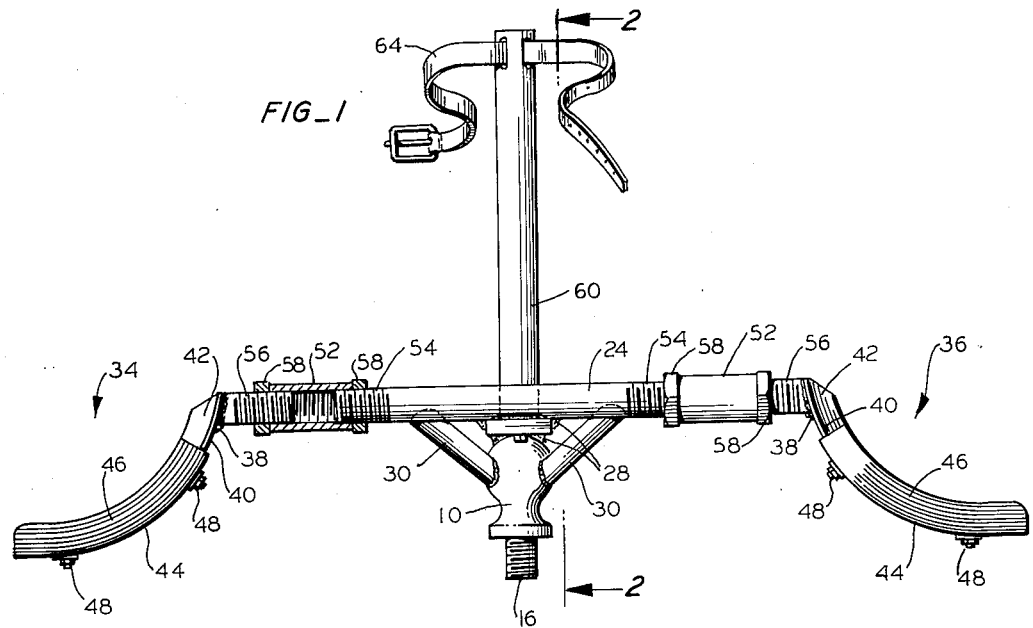
FIG_1
FIG_2  FIG_4  FIG_3
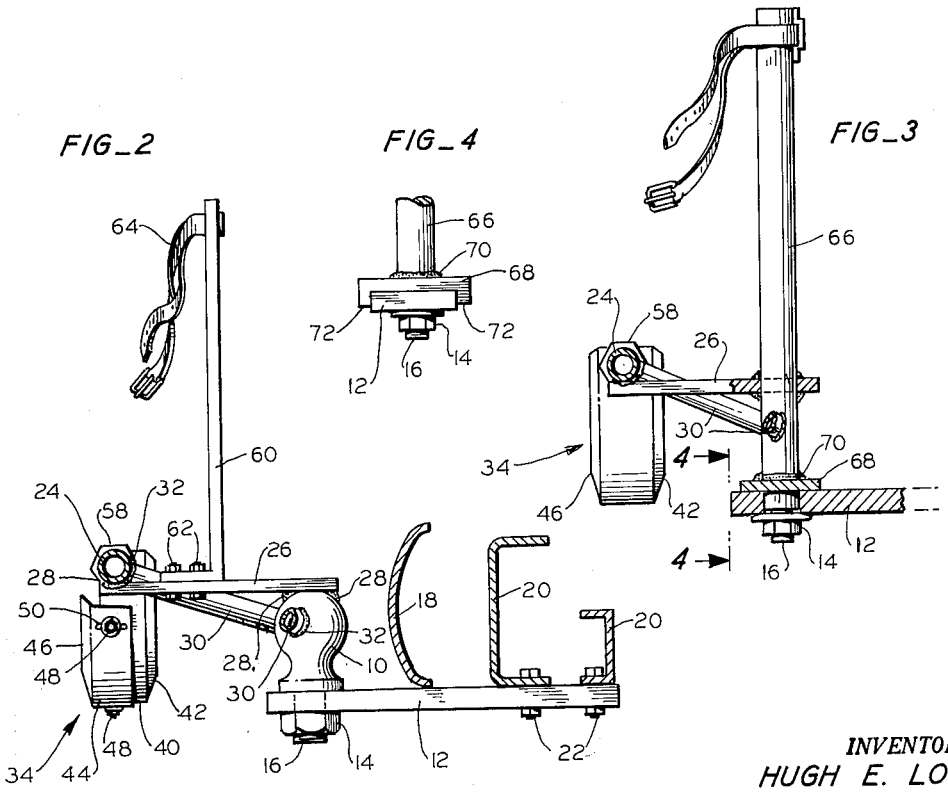
INVENTOR.
HUGH E. LOGAN
BY *Naylor + Neal*
ATTORNEYS United States Patent Office 3,240,406
Patented Mar. 15, 1966

3,240,406
CYCLE CARRIER FOR VEHICLES
Hugh E. Logan, Rte. 1, Box 325, Willows, Calif.
Filed June 16, 1961, Ser. No. 117,704
5 Claims. (Cl. 224—42.03)

This invention relates to carriers for two-wheeled vehicles and more specifically to a carrier adapted to be mounted on an automobile and to support a two-wheeled vehicle on the automobile.

It is a principal object of this invention to provide a carrier for two-wheeled vehicles which can support heavy two-wheeled vehicles on an automobile efficiently and which is adapted to be mounted on the automobile in a very efficient manner.

It is another object of the invention to provide such a two-wheeled vehicle carrier which may be supported on an automobile solely by a conventional trailer hitch attachment on the automobile.

It is another object of the invention to provide such a carrier for two-wheeled vehicles which will provide efficient and reliable support for heavy two-wheeled vehicles during all conditions of operation of the automobile which carries the two-wheeled vehicle.

It is another object of the invention to provide such a carrier for two-wheeled vehicles which is adjustable to permit its use in carrying a variety of two-wheeled vehicles having different dimensions.

It is another object of the invention to provide such a carrier which is simple to manufacture and use and which is very strong and durable.

Other objects and advantages of the invention will become apparent from the following description read in conjunction with the attached drawings in which:

FIG. 1 is a rear elevational view of a two-wheeled vehicle carrier constructed in accordance with the principles of the invention;

FIG. 2 is a vertical sectional view of the carrier of FIG. 1 showing the carrier mounted on an automobile;

FIG. 3 is a view similar to FIG. 2 showing an alternative construction for the carrier of the invention; and FIG. 4 is a fragmentary view of the apparatus of FIG. 3 taken along the plane and in the direction indicated at 4—4 in FIG. 3.

Referring now in detail to the drawings and particularly to FIGS. 1 and 2, the carrier illustrated therein comprises a base support member 10 which is conveniently made from the trailer hitch ball of a conventional trailer hitch or may be made from a three-quarter inch bolt. The base support member 10 is rigidly and detachably mounted on a trailer hitch bar 12 by a nut 14 threadedly received on a threaded shank 16 of the base support member 10. The carrier of the invention is preferably used with the type of strong and permanent trailer hitch illustrated in FIG. 2 and in which the trailer hitch bar 12 extends under the rear bumper 18 of an automobile and is connected to chassis members 20 of the automobile by means of bolts 22 or welding.

A transverse support member 24 is rigidly and permanently connected to the base support member 10 by a horizontal bar 26 welded to the base 10 welds 28 and diagonal strut members 30 welded to the base 10 and transverse support member 24 by welds 32.

A pair of wheel receiving cradles 34 and 36 are provided on opposite ends of the transverse support member 24 secured thereto by suitable welds 38. Each of the cradles 34 and 36 comprises an inner cradle member having a bottom portion 40 welded to the transverse support member 24 by the welds 38 and curved to receive the periphery of the wheel of a two-wheeled vehicle. A side wall 42 extends from the bottom wall 40. A second cradle portion having a similar curved bottom wall 44 and side wall 46 is mounted on the bottom wall 40 of the cradle by means of bolts 48. The bolts 48 are passed through elongated overlapping apertures 50 (see FIG. 2) in the bottom walls 40 and 44 whereby the side walls 42 and 46 of each cradle may be positioned adjustably with respect to each other.

Each end of the transverse support member 24 is provided with a telescoping section whereby the cradles 34 and 36 may be positioned adjustably with respect to each other. Each telescoping section comprises a sleeve 52 threadedly received at its opposite ends on inner and outer sections 54 and 56 respectively of the transverse support member 24. Suitable lock nuts 58 are provided at each end of each sleeve 52 whereby the sleeves 52 may be rigidly clamped in place.

In some instances it may be desirable to provide a vertical support on the carrier whereby an upper portion of a two-wheeled vehicle may be supported on the carrier in addition to the vehicle's wheels. Such a suitable vertical support is illustrated as the vertical bar 60 bolted at its lower end to the strut 26 by means of bolts 62 and carrying at its upper end a strap 64 which may be passed around any suitable portion of the two-wheeled vehicle being supported by the device.

When the carrier illustrated in FIG. 1 is employed for carrying a two-wheeled vehicle, the distance between the wheel receiving cradles 34 and 36 is adjusted so that the peripheries of the wheels of the two-wheeled vehicle will rest upon the bottom walls 40 and 44 of the cradles, and the lock nuts 58 are rigidly tightened into place. Obviously other means for adjusting the relative positions of the cradles 34 and 36 may be used such as the provision of telescoping tubes locked in place by transverse pins. The distance between the side walls 42 and 46 of each cradle is adjusted by manipulation of bolts 48 until the side walls are separated by a distance approximately equal to the width of the wheels of the two-wheeled vehicle to be carried. The two-wheeled vehicle is then placed upon the carrier with its wheels received in the cradles 34 and 36 and if desired the strap 64 may be attached to an upper portion of the frame of the vehicle. It should be noted that that in most instances the use of the strap 64 is unnecessary since the cradles 34 and 36 embrace both the side walls and peripheries of the wheels of the two-wheeled vehicle and provide support for the two-wheeled vehicle to maintain it in place on the carrier without the use of the strap 64.

The two-wheeled vehicle may be mounted on the carrier very easily by first positioning it parallel to the carrier, then lifting the front (steering) wheel and placing it in the cradle 34 and finally lifting the rear (driving) wheel and placing it in the cradle 36. This procedure permits one man to mount heavy motor scooters and motor cycles on the carrier unassisted.

The carrier shown in FIGS. 1 and 2 provides efficient and sturdy support for bicycles and for heavy cycles such as motor scooters and motor cycles. The carrier is particularly well suited for carrying small motor cycles such as that sold under the trademark "Tote Gote," which are popular with hunters. The carrier is universally adapted for adjustment to permit its use in carrying all sorts of two-wheeled vehicles since the distance between the cradles 34 and 36 may be adjusted readily and since the distance between the side walls 42 and 46 of each cradle may be readily adjusted.

The alternative form of carrier shown in FIGS. 3 and 4 is substantially similar to the carrier of FIGS. 1 and 2 differing from the structure of FIGS. 1 and 2 in that the base member 10 and vertical bars 60 have been replaced by a single continuous rod 66 to which the horizontal strut 26 and diagonal struts 30 are welded. A horizontal plate 68 is welded to the shaft 66 below the strut 26 by means of welding 70, and a pair of side flanges 72 (see FIG. 4) are provided on the plate 68 embracing the sides of the trailer hitch bar 12. The bar 66 is mounted on the trailer hitch bar 12 by a threaded shank 16 and nut 14 in a manner similar to that shown in FIGS. 1 and 2. It should be noted that the side flanges 72 on the plate 68 prevent rotation of the rod 66 with respect to the trailer hitch bar 12. The wheel receiving cradles 34 and 36 of the alternative structure shown in FIGS. 3 and 4 are constructed without the adjustability feature permitting adjustment of the side walls 42 and 46 of the cradles.

While two specific embodiments of the two-wheeled vehicle carrier of the invention have been illustrated and described in detail hereinabove, these embodiments are but a few of the many ways in which the principles of the invention may be employed without departing from the spirit and scope of the invention:

I claim:

1. A cycle carrier adapted to be mounted on an automobile where the automobile has a chassis and a rear bumper and a trailer hitch bar rigidly mounted on said chassis and extending rearwardly from said chassis to a position beyond said bumper and having a generally vertical aperture therethrough rearwardly of said bumper for mounting a trailer hitch ball thereon, said cycle carrier comprising: a base support member adapted to be mounted on said bar and having a threaded shank thereof adapted to extend through said aperture, a nut threadedly received on said shank and rigidly for detachably securing said base support member to said bar with said shank and nut forming the sole means for attaching the carrier to an automobile, an elongated support portion rigidly mounted on said base support member generally perpendicular to said shank and laterally spaced from said shank and adapted to be supported transversely of said automobile rearwardly from said trailer hitch bar when said shank and nut are attached to said trailer hitch bar, and a pair of cycle engaging members mounted on said elongated support portion with said cycle engaging members positioned spaced apart longitudinally of said elongated support portion from each other for supporting a cycle at two locations spaced apart along said elongated support portion with the cycle generally parallel to said elongated support portion, at least one of said cycle engaging members comprising a wheel receiving cradle having a pair of side walls generally parallel to said elongated support portion for embracing the sides of a cycle wheel between them and a cradle bottom wall connecting said side walls for embracing the periphery of said cycle wheel.

2. The cycle carrier of claim 1 in which said elongated support portion is attached to said base support member by a first strut generally parallel to said hitch bar and perpendicular to both said shank and said elongated support portion and a pair of diagonal strut members welded to said base support member below said first strut and welded to said transverse support member on opposite sides of said first strut.

3. The cycle carrier of claim 1 in which a pair of generally vertical flanges are provided on said base support member for embracing said hitch bar between them and thereby preventing rotation of said base support member with respect to said hitch bar.

4. A carrier for bicycles and the like adapted to be mounted on an automobile solely by attachment to a conventional trailer hitch on said automobile which comprises: a base support portion having a threaded shank extending therefrom and adapted to be inserted in a vertical aperture in said hitch in lieu of a trailer hitch ball, a nut threadedly received on said shank for rigidly and detachably securing said base support portion on said trailer hitch, a transverse support portion having opposite ends and a longitudinal axis extending between said opposite ends, said transverse support portion being rigidly connected to said base support portion with said longitudinal axis extending generally perpendicular to said threaded shank and spaced laterally from said shank whereby said transverse support portion may be supported on an automobile solely by said shank with said longitudinal axis positioned rearwardly from said shank and transversely of the automobile, and a pair of wheel receiving cradles mounted on said opposite ends of said transverse support portion on opposite sides of said shank and positioned to support a pair of wheels generally coplanar with each other and parallel to said longitudinal axis with each of said cradles having a bottom wall for engaging the periphery of a cycle wheel and a pair of side walls mounted on the bottom wall for engaging the sides of a cycle wheel with at least one of said side walls of each cradle adjustably mounted on said bottom wall for adjustable movement toward and away from the other side wall of said cradle.

5. The carrier of claim 4 having means adjustably mounting said cradles with respect to each other on said transverse support member for changing the distance along said axis between said cradles.

References Cited by the Examiner

UNITED STATES PATENTS

| 963,808 | 7/1910 | Rigny | 224—42.46 |
|---|---|---|---|
| 1,452,639 | 4/1923 | Holway | 224—42.43 |
| 2,379,994 | 7/1945 | Schwinn. | |
| 2,576,222 | 11/1951 | Hill. | |
| 2,772,799 | 12/1956 | Bridinger | 224—42.03 |
| 2,895,729 | 7/1959 | Sanders | 248—176 X |
| 3,072,274 | 1/1963 | Atwell | 214—450 |

FOREIGN PATENTS

| 615,908 | 10/1926 | France. |
|---|---|---|
| 193,277 | 2/1923 | Great Britain. |
| 97,617 | 12/1939 | Sweden. |
| 102,010 | 7/1941 | Sweden. |
| 129,225 | 8/1950 | Sweden. |

GERALD M. FORLENZA, *Primary Examiner.*

WALTER A. SCHEEL, HUGO O. SCHULZ, *Examiners.*